United States Patent [19]
Orlando

[11] B 3,982,255
[45] Sept. 21, 1976

[54] IMAGE STABILIZATION SYSTEM

[75] Inventor: Carl Orlando, New Shrewsbury, N.J.

[73] Assignee: The United States of America as represented by the Secretary of the Army, Washington, D.C.

[22] Filed: Dec. 17, 1974

[21] Appl. No.: 533,580

[44] Published under the second Trial Voluntary Protest Program on February 3, 1976 as document No. B 533,580.

[52] U.S. Cl. ................................ 354/70; 354/71; 250/203 R
[51] Int. Cl.² ........................................ G03B 39/00
[58] Field of Search .................... 354/70, 65, 71, 31; 250/203

[56] References Cited
UNITED STATES PATENTS

| | | | |
|---|---|---|---|
| 2,774,961 | 12/1956 | Orlando | 250/210 X |
| 3,293,439 | 12/1966 | Marantette et al. | 250/203 R |
| 3,296,444 | 1/1967 | Wilson | 250/203 R |

*Primary Examiner*—Robert P. Greiner
*Attorney, Agent, or Firm*—Nathan Edelberg; Frank J. Dynda; Jeremiah G. Murray

[57] ABSTRACT

An image stabilization system for maintaining a fixed relationship between a target to be photographed and an image of the target as recorded on a photographic film. The system comprises a primary lens system which focuses the image of the target onto first and second optical density wedges, each having a scale of continuous linear density gradations. The wedges are positioned with their respective scales at angles to each other. The light transmitted through the first and second optical density wedges is received by first and second photo-electric cells. The changes in potentials caused by the target movement with respect to the photographic film is received from the photo-electric cells by first and second torquer motors which move a film plate which holds the photographic film in a direction on a given plane corresponding to the target movement.

5 Claims, 1 Drawing Figure

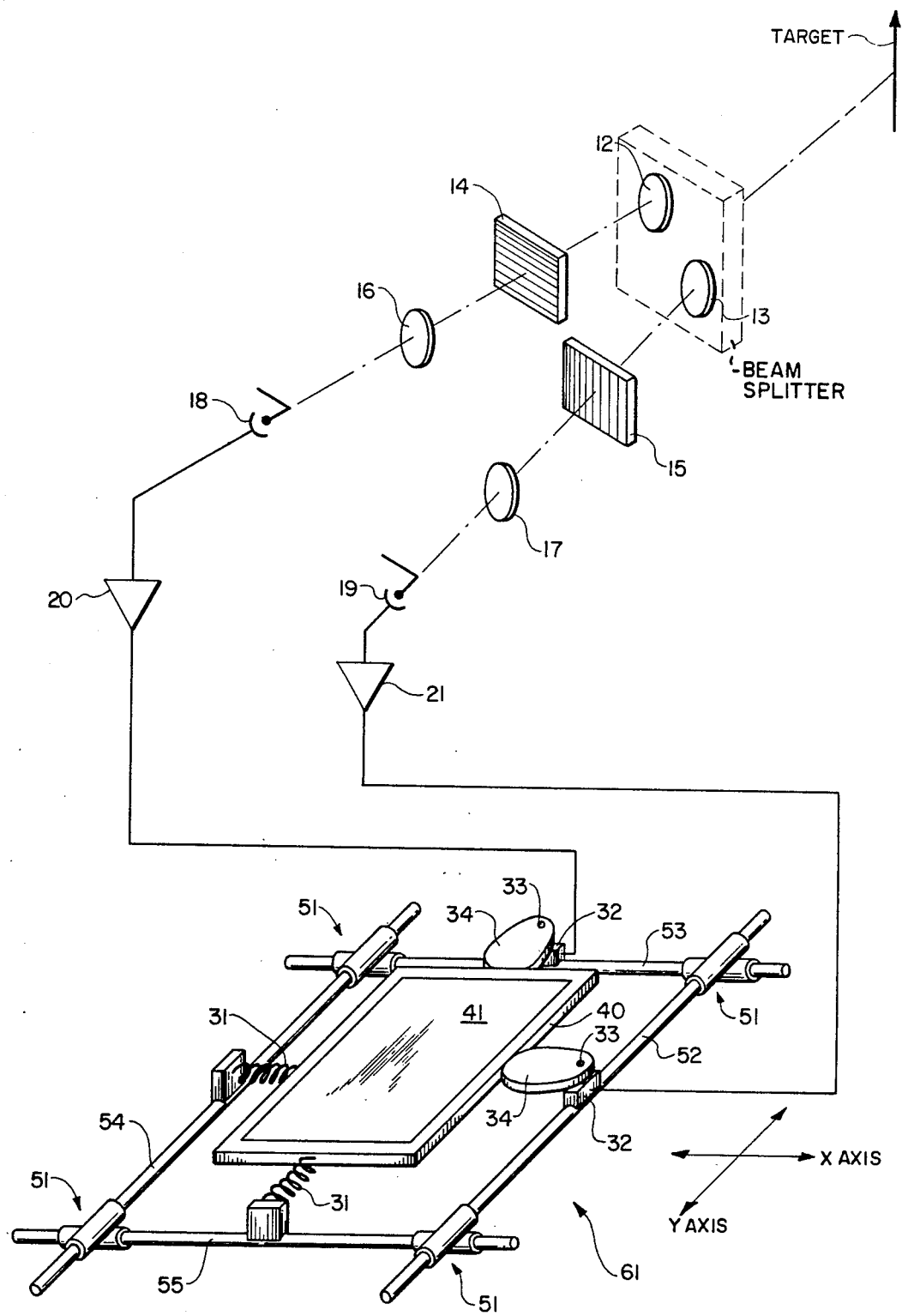

IMAGE STABILIZATION SYSTEM

BACKGROUND OF THE INVENTION

This invention relates to image motion compensation and more particularly to a system for maintaining a fixed relationship between a target to be photographed and an image of the target as recorded on a photographic film by use of a lock-on technique.

The subject invention is used in a variety of applications where movement of an image to be recorded or movement of a camera used to record an image is unavoidable. One such application is in the area of aerial photography.

One of the most important requirements of aerial photography is the undistorted reproduction of a recorded image. Compliance with this requirement is made most difficult because of the very nature of aerial photography. When an aircraft with an aerial camera is airborne numerous factors which cause a distorting of the recorded image come into play. Among these factors are forward movement of the aircraft, sidewise movement of the aircraft caused by side winds, changes in aircraft altitude, and vibration of the aircraft. The conventional techniques for image stabilization address themselves to solving the problems raised by one or more of the image distortion factors.

A fast shutter speed is the most conventional way of freezing a recorded image. This means has proven to be ineffective when applied to aerial photography. Since the aerial camera moves while the shutter is open, a blur is always produced. In addition a fast shutter speed necessitates the use of wide lens apertures and fast photographic emulsions which result in an unacceptable loss in image resolution. In the alternative the lens may be swung or the whole camera panned to follow the target. This method cannot be applied to aerial photography because of the weight, mounting restrictions and complexity of the aerial camera and associated apparatus.

The most widely accepted technique for effectively stopping the movement of an image relative to a film caused by the object or the camera moving during exposure is commonly known as image motion compensation. In image motion compensation a relatively sharp image of a moving object is recorded on film by advancing the film in step with the image movement or by moving the optical system.

Image motion compensation (hereinafter referred to as IMC) has been accomplished in a number of ways. A film is moved during exposure in step with the image movement, either by moving the film plate or register glass or by advancing the film itself. Various means of moving the film are used. The film may be pulled by its edges. The film may be held by suction to a moving plate. The back of the camera may be moved.

The speed and direction of image motion are assessed and the film is made to travel at this speed, while the camera is aligned to match the direction. In this way, the image remains virtually motionless on the film.

IMC permits slower shutter speeds and therefore the use of slower, more highly corrected lenses and slower fine-grain film.

The focal length of the lens, aircraft height, and speed determine film movement. These are often monitored and fed in electronically.

Even with IMC certain errors still exist. These errors include aircraft drift due to side winds, tilt and height variations. Drift and tilt errors may be eliminated by rotating and giro-stabilized camera mounts. Height errors may be corrected by re-sealing in the enlarger.

SUMMARY OF THE INVENTION

The subject invention is applied to aerial photography for image stabilization. That is, the system maintains a fixed relationship between a target to be photographed and an image of the target as it is recorded on a photographic film.

The system consists basically of a primary lens system, which receives the light rays of the target under surveillance and splits these light rays into two beams. A pair of optical density wedges each having a scale of continuous linear density gradations are positioned with their respective scales at angles to each other and in position for the first wedge to transmit the first light beam onto a photo-electric cell, and for the second wedge to transmit the second light beam onto another photo-electric cell. Such a system as has just been presented is described in greater detail in my U.S. Pat. No. 2,774,961.

Unlike U.S. Pat. No. 2,774,961, where the photo-electric cells are connected in a bridge circuit, the present invention employs a servo-system responsive to the output voltages of the photo-electric cells to move the photographic film in all directions on a given plane in consonance with the movements of an aerial camera which is recording a target image.

A primary object of the invention is to provide a simple system for maintaining a fixed relationship between a target to be photographed and an image of the target as it is recorded on a photographic film.

Another object is to provide a portable yet rugged image stabilization system for use in aerial photography.

Still another object is to an image stabilization system which corrects for multi-directional motions inherent in aerial photography.

Yet another object is to provide an image stabilization system which allows a camera to use slower lenses and slower, fine-grain film, Other objects, features, and advantages of the invention will become apparent to those skilled in the art as the disclosure is made in the following description and drawings of a preferred embodiment of the invention.

BRIEF DESCRIPTION OF THE DRAWINGS

The lone FIGURE is a diagrammatic illustration of a preferred embodiment of the invention.

DESCRIPTION OF THE PREFERRED EMBODIMENT

The embodiment of the invention to be described is used in an aerial camera. For purposes of illustration, however, it is not considered necessary to describe the camera and its supporting structure in detail. Any suitable structure may be adopted to fulfill the requirements of a desired application.

Referring now to the lone FIGURE, a preferred embodiment of the subject invention is shown. The target under surveillance, consists of a section of terrain represented by light and dark areas. A primary lens system comprising a pair of lenses 12 and 13 focus an image of the target respectively onto a pair of optical density wedges 14 and 15, preferably of the same or similar density range. As shown the gradation scales of the density wedges 14 and 15 are at angles with respect to each other. While any angle may be used, it has been found that a ninety degree angle affords the best results and easiest implementation of the subject invention.

On the side of the wedges 14 and 15 opposite to that of the lenses 12 and 13 are a pair of light sensitive devices 18 and 19 preferably of the electronic photo-sensitive type which receive light transmitted through the wedges 14 and 15. Desirably, but not necessarily, a pair of light concentrating lenses 16 and 17 are interposed between the wedges and the photo-electric means 18 and 19. By concentrating the light in this manner the response of the photo-electric means 18 and 19 to a change in light energy is increased. There are several types of photo-electric devices which may be used such as photo-cells, image intensifiers, or photo-multiplier tubes with or without amplification. Thus, sensitivity of the light responsive device may be very high.

A film plate transport apparatus 61 takes the outputs developed by the photo-electric means 18 and 19 and moves a photographic film 41 in the proper direction to compensate for the motion of the aerial camera. Desirably, but not necessarily, amplifiers 20 and 21 are used to increase the outputs from the photo-electric means 18 and 19, respectively, thereby increasing the responsive sensitivity of the film plate transport apparatus 61.

For purposes of this presentation it is assumed that the aerial camera is mounted in the floor of an aircraft and is taking pictures of a ground target. As such a photographic film 41 must be maintained in a surface plane parallel to the ground target. Film plate 40 is positioned to ensure that parallel arrangement of the photographic film 41 and the ground target.

As a result of the motion of the aircraft housing the aerial camera, it is necessary to move the film plate 40 in all directions on the surface plane to compensate for this motion and to reestablish the original field of view. This accomplished by providing a means for moving the film plate 40 back and forth on two straight line paths which lie on and which intersect at some point on the surface plane. It has been found that the best results may be obtained by using the traditional XY coordinate system on the surface plane and having means to independently move the film plate 40 along the X-axis and the Y-axis.

The movement of the film plate 40 is accomplished through the use of four multi-sleeve members 51 through which four rods 52–55 are movably positioned. As such two of the rods 52 and 54 can independently move along the Y-axis and the remaining two rods 53 and 55 can independently move along the X-axis.

A pair of motors 32 are fixedly positioned on rods 52 and 53. The motors are capable of moving in clockwise and counterclockwise increments in response to the outputs of the photo-electric means 18 and 19. Any convenient type of torquer or step motor may be utilized. Each motor 32 has a rotating shaft 33 to which a cam 34 is fixedly positioned. This cam 34 provides a means to move the film plate 40 along the X-axis, the Y-axis or a combination of both. A pair of springs 31 provide the means for maintaining the contiguous relationship between the cams 34 and the film plate 40.

In the operation of the preferred embodiment when no movement occurs within the field of view, a fixed and stable quantity of light reaches the photo-electric means 18 and 19. Since the light reaching the cells has passed through the density wedges 14 and 15 the quantity of light reaching the respective photo-electric means 18 and 19 is regulated thereby.

When the field of view is altered due to the motion of the aerial camera the target will move into an area of different density on each of the density wedges 14 and 15. This will cause an increase or decrease in the output of each of the photo-electric means 18 and 19 depending on where the target has moved with respect to the density wedges 14 and 15. The film plate transport apparatus 61 will then move in response to the changed outputs of the photo-electric means 18 and 19 to compensate for this alteration in the field of view.

It should be understood, of course, that the foregoing disclosure relates to only a preferred embodiment of the invention and that numerous modifications or alterations may be made therein without departing from the spirit and the scope of the invention as set forth in the appended claims.

What is claimed is:
1. An image stabilization system for maintaining a fixed relationship between a target to be photographed and an image of the target to be recorded on a photographic film comprising:
   a. a primary lens system for receiving light rays from said target and for splitting said light rays into first and second light beams;
   b. first and second optical density wedges each having a scale of continuous linear density gradations, said wedges being positioned with their respective scales at angles to each other and in position for said first wedge to transmit said first light beam and said second wedge to transmit said second light beam;
   c. first and second photo-electric means responsive to said first and second transmitted light beams, respectively, for producing variable first and second output voltages; and
   d. means responsive to said first and second output voltages for moving said photographic film in all directions on a given plane in consonance with the variations in said first and second output voltages.

2. The image stabilization system according to claim 1 further comprising:
   means positioned between said optical density wedges and said photo-electric means for increasing the detection sensitivity of said photo-electric means.

3. The image stabilization system according to claim 2 wherein said detection sensitivity increasing means comprises:
   a. a first light concentrating lens system positioned between said first optical density wedge and said first photo-electric means, and
   b. a second light concentrating lens system positioned between said second optical density wedge and said second photo-electric means.

4. The image stabilization system according to claim 1 wherein said respective scales of said first and second optical density wedges are at ninety degree angles with respect to each other.

5. The image stabilization system according to claim 1 wherein said primary lens system is a beam splitter.

* * * * *